United States Patent
Wall et al.

(10) Patent No.: US 10,526,238 B2
(45) Date of Patent: Jan. 7, 2020

(54) DISSOLVABLE OBJECTS

(71) Applicant: 1824930 Alberta Ltd., Acheson (CA)

(72) Inventors: Wesley Wall, Edmonton (CA); Adam Wall, Acheson (CA); Ray Whitaker, Acheson (CA)

(73) Assignee: 1824930 Alberta Ltd., Acheson (CA)

( * ) Notice: Subject to any disclaimer, the term of this patent is extended or adjusted under 35 U.S.C. 154(b) by 0 days.

(21) Appl. No.: 15/502,086

(22) PCT Filed: Aug. 5, 2015

(86) PCT No.: PCT/CA2015/050737
§ 371 (c)(1),
(2) Date: Feb. 6, 2017

(87) PCT Pub. No.: WO2016/019464
PCT Pub. Date: Feb. 11, 2016

(65) Prior Publication Data
US 2017/0226001 A1   Aug. 10, 2017

Related U.S. Application Data

(60) Provisional application No. 62/033,642, filed on Aug. 5, 2014.

(51) Int. Cl.
| C03C 3/14 | (2006.01) |
| C03B 19/02 | (2006.01) |
(Continued)

(52) U.S. Cl.
CPC .............. C03C 3/14 (2013.01); C01B 35/12 (2013.01); C03B 19/02 (2013.01); C03B 25/00 (2013.01);
(Continued)

(58) Field of Classification Search
CPC ...... A61K 9/1611; A61K 9/501; C03C 1/006; C03C 11/002; C03C 12/00
See application file for complete search history.

(56) References Cited

U.S. PATENT DOCUMENTS

| 4,102,664 A | 7/1978 | Dumbaugh, Jr. |
| 4,294,655 A | 10/1981 | Pfeffer |
(Continued)

FOREIGN PATENT DOCUMENTS

| CA | 2 240 216 A1 | 12/1999 |
| EP | 2 374 991 A2 | 10/2011 |
(Continued)

OTHER PUBLICATIONS

Doweidar et al. Density of mixed alkali borate glasses: A structural analysis. Physica B: Condensed Matter vol. 362, Issues 1-4, May 15, 2005, pp. 123-132.*

(Continued)

*Primary Examiner* — Noah S Wiese
(74) *Attorney, Agent, or Firm* — Christensen O'Connor Johnson Kindness, PLLC

(57) ABSTRACT

A method of forming a dissolvable part of amorphous borate includes: preparing a mixture comprising one or more boron compounds and one or more alkali compounds, at least one of the one or more boron compounds and the one or more alkali compounds being hydrous; heating the mixture to a melting temperature for a predetermined time to melt the mixture and release water from the mixture to form an anhydrous boron compound that is moldable, wherein the amount of alkali compound being selected to achieve an alkali oxide content of between about 10 to 25%; with the anhydrous boron compound at a molding temperature, molding the anhydrous boron compound in a mold; and cooling the anhydrous boron compound to form a solid.

14 Claims, 5 Drawing Sheets

(51) Int. Cl.
*E21B 34/14* (2006.01)
*C03B 25/00* (2006.01)
*C01B 35/12* (2006.01)
*C03C 4/00* (2006.01)
*C03B 25/04* (2006.01)
*E21B 33/12* (2006.01)
*E21B 43/26* (2006.01)

(52) U.S. Cl.
CPC ............ *C03B 25/04* (2013.01); *C03C 4/0014* (2013.01); *C03C 4/0035* (2013.01); *E21B 34/14* (2013.01); *C03C 2204/00* (2013.01); *E21B 33/12* (2013.01); *E21B 43/26* (2013.01)

(56) References Cited

U.S. PATENT DOCUMENTS

| | | | |
|---|---|---|---|
| 4,587,267 | A | 5/1986 | Drake et al. |
| 4,904,522 | A | 2/1990 | Markusch |
| 5,573,055 | A | 11/1996 | Melling et al. |
| 5,846,305 | A | 12/1998 | Payzant |
| 5,997,971 | A | 12/1999 | Wall et al. |
| 6,001,279 | A | 12/1999 | Payzant et al. |
| 6,138,422 | A | 10/2000 | Wall et al. |
| 6,168,870 | B1 | 1/2001 | Wall |
| 6,302,028 | B1 | 10/2001 | Guillot-Ulmann et al. |
| 6,358,531 | B1 * | 3/2002 | Day ..................... A61K 9/1611 424/456 |
| 6,881,766 | B2 | 4/2005 | Hain |
| 7,160,606 | B2 | 1/2007 | Wall et al. |
| 7,661,481 | B2 | 2/2010 | Todd et al. |
| 7,713,553 | B2 | 5/2010 | Wall et al. |
| 8,430,173 | B2 | 4/2013 | Todd et al. |
| 8,430,174 | B2 | 4/2013 | Holderman et al. |
| 8,597,419 | B2 | 12/2013 | Betts |
| 2004/0074643 | A1 | 4/2004 | Munoz, Jr. et al. |
| 2007/0277979 | A1 | 12/2007 | Todd et al. |
| 2011/0247833 | A1 | 10/2011 | Todd et al. |
| 2012/0061088 | A1 | 3/2012 | Dykstra et al. |

FOREIGN PATENT DOCUMENTS

| | | |
|---|---|---|
| GB | 542630 | 1/1942 |
| WO | 00/02004 A2 | 1/2000 |
| WO | 03/025303 A1 | 3/2003 |
| WO | 2008/086604 A1 | 7/2008 |
| WO | 2011/130063 A2 | 10/2011 |
| WO | 2015/095745 A1 | 6/2015 |

OTHER PUBLICATIONS

Makishima et al. Direct Calculation of Young's Modulus of Glass. Journal of Non-Crystalline Solids, 12(1), pp. 35-45, 1973.*

Ruller et al. The mixed cation effect in silver-alkali borate glasses. Phys. Chem. Glasses, 29 (5), pp. 209-213. 1988.*

Aslanova, M.S., and S.Z. Vol'Skaya, "Strength and Structure of Fibers from Borate, Cadmium, and Lead Glasses," in "The Structure of Glass: vol. 6—Properties, Structure and Physical—Chemical Effects," translated from Russian by E. Boris Urarov, New York: Consultants Bureau, pp. 227-230, 1966.

Donohoe, L.M., and J.E. Shelby, "Formation and Properties of Soda-Lime Borate Glasses," Physics and Chemistry of Glasses—European Journal of Glass Science and Technology Part B 47(1):16-21, Jun. 2005.

Doweidar, H., et al., "Density of Mixed Alkali Borate Glasses: A Structural Analysis," Physica B: Condensed Matter 362(1-4):123-132, May 2005.

El-Alaily, N.A., et al., "Durability of Some Gamma-Irradiated Alkali Borate Glasses," Radiation Physics and Chemistry 44(1-2):45-51, Jul.-Aug. 1994.

Khazanov, V.E., et al., "Glass Fibers," in V.I. Kostikov (ed.), "Fibre Science and Technology," Chapman and Hall, London, Chap. 1, pp. 15-230, 1995.

Makishima, A., and J.D. Mackenzie, "Direct Calculation of Young's Modulus of Glass," Journal of Non-Crystalline Solids 12(1):35-45, 1973.

Pye, L.D., et al., "Borate Glasses: Structure, Properties, Applications (Materials Science Research)," Springer, vol. 12, 1978, 648 pages.

Rahaman, M.N., et al., "Bioactive Glass in Tissue Engineering," Acta Biomaterialia 7(6):2355-2373, Jun. 2011.

Ruller, J., and J.E. Shelby, "The Mixed Cation Effect in Silver-Alkali Borate Glasses," Physics and Chemistry of Glasses 29(5):209-213, 1988.

Veléz, M.H., et al., "Chemical Durability of Lithium Borate Glasses," Journal of Non-Crystalline Solids 49(1-3):351-362, May 1982.

Wood, W.G., "An Introduction to Boron: History, Sources, Uses, and Chemistry," Environmental Health Perspectives 102(7):5-11, Nov. 1994.

Zhang, Z., "Corrosion of $20M_2O.80B_2O_3$ (M=Li, Na and K) Glasses in Water," Physics and Chemistry of Glasses 37(5):221-222, 1996.

Zhang, Z., et al., "Water Corrosion Behavior of Densified Glass. II. Borate Glasses," Journal of Non-Crystalline Solids 135(1):62-66, Oct. 1991.

* cited by examiner

DISSOLVABLE OBJECTS

TECHNICAL FIELD

This relates to dissolvable objects made from anhydrous boron. The dissolvable objects may be particularly useful for downhole applications, such as selective fracturing tools, and may be used in other areas or industries where dissolvability is desired.

BACKGROUND

Boron is a known additive for glass, and can be used to adjust the properties of a material. For example, boron can enhance the strength and thermal properties of silicate glass when used as an additive, such as in Pyrex™ glassware.

In other circumstances, boron can be used to make dissolvable glass, such as is described in U.S. Pat. No. 8,430,174 (Holderman et al.) entitled "Anhydrous boron-based timed delay plugs", which describes the use of dissolvable glass parts made from anhydrous boron to be used for downhole applications in hydrocarbon-producing wells. In particular, dissolvable parts may be particularly useful in selective fracturing tools, which allow pressure to be selectively applied to a downhole formation in order to stimulate production. One type of selective fracturing tool commonly used in the industry allows for multistage fracturing. These tools involve the use of different sizes of balls or parts that are pumped downhole to open a particular stage in the fracturing tool. Once the fracturing operation is complete, the balls must be removed, which is generally done by various methods such as by drilling the balls out, backpressure suction, or backpressure release after hold pressure is completed. The use of a dissolving ball would avoid the need to retrieve the balls and the associated costs and difficulties.

SUMMARY

According to an aspect, there is provided a method of forming a dissolvable part of amorphous borate, the method comprising the steps of: preparing a mixture comprising one or more boron compounds and one or more alkali compounds; heating the mixture to a melting temperature for a predetermined time to form an anhydrous boron compound that is moldable, wherein the amount of alkali compound being selected to achieve an alkali oxide content of between about 10 to 25%; molding the anhydrous boron compound in a mold; an cooling the anhydrous boron compound to form a solid.

According to another aspect, a majority of the alkali compound may be a sodium compound.

According to another aspect, the anhydrous boron compound may be cooled to below a strain point of the solid at a minimum cooling rate that is inversely proportional to the square of one-half the thickness or diameter of the solid being formed for a solid being cooled from more than one side.

According to another aspect, the anhydrous boron compound may be initially cooled by about 10° C. over at least a two hour period.

According to another aspect, the melting temperature may be about 400° C. or greater, and may be less than about 1000° C.

According to another aspect, the mold may be preheated to a temperature that is less than the melting temperature.

According to another aspect, the method may further comprise the step of adding an additive to the mixture to adjust a dissolve rate of the solid.

According to an aspect, the mixture may comprise one or more additives having at least one of corrosion resistant and antibacterial properties.

According to another aspect, the mixture may comprise equal measures by weight of boric acid and disodium octaborate tetrahydrate.

According to another aspect, the mixture may comprise one or more compounds selected from a group consisting of: hydrated alkaline borates, hydrated nonalkaline borates, refined borate, mineral borate, sodium borate, sodium metaborate, disodium octaborate tetrahydrate, borax, boric acid, copper borate, lithium borate, potassium borate, silver borate, zinc borate, boron halide, colemanite, kernite, probertite, tincal, and ulexite.

According to another aspect, the method may further comprise the step of selecting the amount of the one or more hydrous compounds in the mixture to adjust a dissolve rate of the solid.

According to another aspect, the mixture may be heated to a temperature of between about 400° C. and about 1050° C., or to a temperature of between about 800° C. and about 900° C.

According to another aspect, the mixture may be cooled to below the glass transition temperature over a period of between 1 and 4 hours.

According to another aspect, the part is a sphere with a diameter of about 3 inches or less.

According to another aspect, the method may further comprise the step of adjusting the dissolvability by adding an additive selected from a group I, group II, and group III metal on the periodic table.

According to another aspect, the method may further comprise the step of adjusting the dissolvability by adding an additive selected from a group consisting of copper, manganese, molybdenum, zinc, calcium, and silver.

According to an aspect, there is provided a dissolvable borate part prepared by a process comprising the steps of: creating a mixture of one or more borates and one or more alkalis; melting the mixture by heating to a temperature of between about 700° C. and about 1000° C. to form a moldable fluid, the moldable fluid comprising an alkali oxide content of between about 10 mol % to about 25 mol % and a boric oxide content of between about 75 mol % and about 90 mol %; molding the moldable fluid in a mold; cooling the moldable fluid to form a solid, the anhydrous boron compound being cooled to below a strain point of the solid over a period of at least 1-4 hours; and removing the cooled solid from the mold.

According to another aspect, the mixture is melted at a melt temperature of between about 800° C. and about 900° C.

According to another aspect, the melted mixture may be poured into a mold that has a mold temperature that is less than the melt temperature.

According to another aspect, the moldable fluid may comprise an additive selected from a group consisting of copper, zinc, and silver.

According to another aspect, the dissolvable borate part may further comprise an additive selected from a group I, group II, and group III metal on the periodic table to the mixture.

According to another aspect, the dissolvable borate part may further comprise an additive selected from a group consisting of copper, manganese, molybdenum, zinc, calcium, and silver.

According to another aspect, the anhydrous boron compound may comprise between about 12-20 mol % $Na_2O$ and between about 80-88 mol % $B_2O_3$, or about 18 mol % $Na_2O$ and about 82 mol % $B_2O_3$.

According to another aspect, the part may be a sphere with a diameter equal to or less than about 3 inches and is cooled to the ambient temperature over a period of about 1-3 hours.

According to an aspect, there is provided a dissolvable borate part, comprising an anhydrous borate compound that is molded to form an object having a Young's Modulus of at least 30 GPa, the anhydrous borate compound comprising between about 75 and 90% mol of $B_2O_3$; and between about 10 and 25% mol of one or more alkali oxide.

According to another aspect, the dissolvable borate part of claim may comprise about 82 mol % of $B_2O_3$ and about 18 mol % of the one or more alkali, and the object has a Young's Modulus of at least 40 GPa.

According to another aspect, a majority of the one or more alkali may comprise $Na_2O$.

According to another aspect, the anhydrous borate compound may be substantially free of silicate.

According to an aspect, there is provided a method of forming a dissolvable part of amorphous borate, the method comprising the steps of: preparing a mixture comprising one or more boron compounds and one or more alkali compounds, at least one of the one or more boron compounds and the one or more alkali compounds being hydrous; heating the mixture to a melting temperature for a predetermined time to form a moldable anhydrous boron compound; molding the anhydrous boron compound in a mold; and cooling the anhydrous boron compound to form a solid.

According to another aspect, the amount of alkali compound may be such that the alkali oxide is between 10-25%.

According to another aspect, the anhydrous boron compound may comprise between about 12-20 mol % $Na_2O$ and between about 80-88 mol % $B_2O_3$, or about 18 mol % $Na_2O$ and about 82 mol % $B_2O_3$.

According to another aspect, the mixture may be cooled to below a strain point of the solid over a period of at least 1-4 hours.

According to an aspect, there is provided a method of forming a dissolvable part of amorphous borate, the method comprising the steps of providing a boron mixture comprising one or more hydrated boron compounds, melting the boron mixture by heating the boron mixture to a target temperature, applying heat to release water from the boron mixture to form a moldable anhydrous boron compound, molding the moldable anhydrous boron compound in a mold, the mold being maintained at a mold temperature that is above an ambient temperature, and cooling the moldable anhydrous boron compound to form a solid by maintaining the mold at the mold temperature for at least 1 minute and then cooling the moldable anhydrous boron compound to the ambient temperature over a period of at least 4 hours.

According to another aspect, the method may further comprise the step of adding an additive to the mixture to adjust a dissolve rate of the solid.

According to another aspect, the mixture may comprise one or more additives having at least one of corrosion resistant and antibacterial properties.

According to another aspect, boron mixture may comprise equal measures of boric acid and disodium octaborate tetrahydrate.

According to another aspect the boron mixture may comprise one or more compounds selected from a group consisting of: hydrated alkaline borates, hydrated nonalkaline borates, refined borates, mineral borates, sodium borate, sodium metaborate, disodium octaborate tetrahydrate, borax, boric acid, copper borate, lithium borate, potassium borate, silver borate, zinc borate, boron halide, colemanite, kernite, probertite, tincal, and ulexite.

According to another aspect, the method may further comprise the step of selecting the amount of the hydrated boron compounds in the boron mixture to adjust a dissolve rate of the solid.

According to another aspect, the mixture may be heated to a temperature of between about 340° F. and about 1900° F.

According to another aspect, the mixture may be heated to a temperature of between about 1500° F. and about 1700° F.

According to another aspect, the mixture may be poured into a mold having a temperature of between about 300° F. and about 1200° F.

According to another aspect, the mixture may be poured into a mold having a temperature of between about 600° F. and about 900° F.

According to another aspect, the mold may be maintained between 600° F. and 900° F. for at least 3 minutes prior to cooling the part.

According to another aspect, the boron mixture may be cooled to form the solid over a period of between 8-10 hours.

According to another aspect, the mold may be maintained at the mold temperature for between 1 and 15 minutes.

According to another aspect, the part may be a sphere with a diameter of about or less than 2 inches.

According to another aspect, the part may be cooled over a period of at least 22 hours and the part is a sphere with a diameter of about or greater than 4 inches.

According to an aspect, there is provided a dissolvable borate part prepared by a process comprising the steps of creating a mixture of one or more borates, melting the mixture by heating to a temperature of between about 340° F. and about 1900° F. to form a moldable fluid, molding the moldable fluid in a mold, the mold being maintained at a mold temperature that is above an ambient temperature, cooling the moldable anhydrous boron compound to form a solid by maintaining the mold at the mold temperature for at least 1 minute, removing the solidified mixture from the mold, and cooling the mold to the ambient temperature over a period of at least 4 hours.

According to another aspect, the mixture may be heated to a temperature of between about 1500° F. and about 1700° F.

According to another aspect, wherein the melted mixture may be poured into a mold that has a mold temperature of between 600° F. and 900° F.

According to another aspect, the mold may be maintained at the mold temperature for about 1-15 minutes after receiving the melted mixture and prior to cooling the heated mixture.

According to another aspect, the heated mixture may be cooled over a period of 8-10 hours after being removed from the mold.

According to another aspect, creating a mixture may further comprise adding a corrosion inhibitor selected from a group consisting of copper, zinc and silver.

According to another aspect, creating a mixture may further comprise adding an additive selected from a group I, group II, and group III metal on the periodic table.

According to another aspect, creating a mixture may further comprise adding an additive selected from a group consisting of copper, zinc, and silver.

According to another aspect, creating a mixture may further comprise adding an antibacterial agent selected from a group consisting of silver, copper, zinc and silver.

According to another aspect, creating a mixture may further comprise the step of adjusting the dissolvability by adding an additive selected from a group I, group II, and group III metal on the periodic table.

According to another aspect, creating a mixture may further comprise the step of adjusting the dissolvability by adding an additive selected from a group consisting of copper, manganese, molybdenum, zinc, calcium, and silver.

According to another aspect, the mixture may comprise 25-75% by weight of hydrated boric acid and between 25-75% by weight of disodium octaborate tetrahydrate.

According to another aspect, the mold may be maintained at the mold temperature for between 1 and 15 minutes.

According to another aspect, the part may be a sphere with a diameter of about or less than 2 inches and is cooled to the ambient temperature over a period of about 8 to 10 hours.

According to another aspect, the part may be cooled over a period of at least 22 hours and the part is a sphere with a diameter of about or greater than 4 inches.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

There will now be described a preferred method and composition for forming objects made from a dissolvable material, namely, a properly prepared anhydrous boron glass. It will be understood from the description below that, while all permutations and combinations of features are not described, the features described herein may be combined in any logical and predictable manner by a person of ordinary skill.

Figure 1:
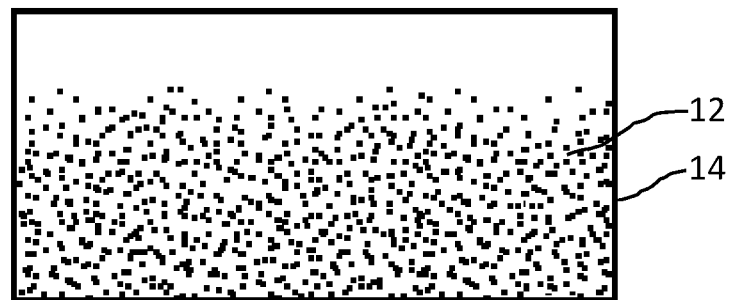
FIG. 1 is a schematic view of a crucible filled with a borate powder mixture.

The method to form the dissolvable parts begins by assembling an appropriate mixture of components 12. Referring to FIG. 1, these components 12 will generally be in powder form as this allows the components to be easily measured and mixed together, although the components may be provided in other convenient states.

In one example, the components of the mixture includes refined or mineral sources of boron. This may include hydrated alkaline and nonalkaline, mineral or refined borates, such as sodium borate, disodium octaborate tetrahydrate (DOT), sodium metaborate, borax, boric acid, metallic borate compounds such as copper, lithium, potassium, silver, and zinc, and other boron halide materials. Mineral borates may also be used, such as colemanite, kernite, probertite, tincal, ulexite, Neobor™ (available from Borax), etc. In addition, multiple sources of boron may be mixed together in equal or disproportionate amounts.

The mixture preferably has at least one hydrous compound, such that the mixture is a hydrous mixture when melted. It has been found that this assists in forming a moldable mixture once heated, and in some cases, the hydrous form of the compounds are less expensive and easier to procure. As will be apparent from the discussion below, other mixtures that are anhydrous and that allow the desired end composition to be achieved may also be used.

Some examples of formulations for making the dissolvable material include: two-part mixtures made up of boric acid and DOT with about 25-50 wt % and 50-75 wt % of each component being present in the mixture; 95 wt % boric acid and 5 wt % DOT; 2.9 wt % copper hydroxide, 7.1 wt % boric acid, and 90 wt % DOT; and 10 wt % copper hydroxide, 10 wt % boric acid, and 80 wt % DOT. In another example, one or more sources of boron are mixed with one or more sources of alkali metal, such as Na, K, Li, or Ca, preferably one of which is in a hydrous form. For example, DoT is a hydrous form of Na, although Na may also be added in other forms, such as NaOH, or a mixture of hydrous and non-hydrous forms. In addition, boron may be added in hydrous or non-hydrous forms, or combinations thereof. Those of ordinary skill will be able to choose appropriate amounts of each component required to achieve the desired end composition, described below.

In one example, the final composition, once heated, will have a formula of between about 10-25 mol % $Na_2O$ and between about 75-90 mol % $B_2O_3$. In a preferred embodiment, there may be about 18 mol % $Na_2O$ and 82 mol % $B_2O_3$. It will be understood that there may be some inherent variation in the actual chemical formula due to imperfect mixing or distribution, or inexact variations. For example, in terms of boric oxide the final compound may have small amounts of both hydrous and anhydrous states of boric oxide. In addition, there may be trace amounts of impurities such as fluoride, sulphate and iron. The amount of variation will depend on the source, and the tolerances for a particular application. Similar considerations may also apply to other components, including alkalis.

As discussed, a portion of Na may be replaced with other alkalis to achieve a desired set of physical characteristics, and other additives may also be present to introduce other elements that may perform other functions. It will be apparent that different additives will affect the properties in different ways, and care must be taken to ensure the properties are suitable for the intended use. As can be seen, the dissolvable material is preferably free of silicates, which is the base material used in forming most common types of glass.

Pure $B_2O_3$ has a $T_g$ (glass transition temperature) of about 260° C. due to the layered structure composed of strong $BO_3$ triangles, which form a layer type of structure similar to that in mica. Bonding between the layers is very weak, allowing a measurable viscosity at low temperature and a high thermal expansion. Adding $Na_2O$ provides an extra oxygen which is used by a B to become 4 fold coordinated, with the extra oxygen providing a bridge between 2 $BO_3$ layers. This reduces mobility of the structure and causes a decrease in thermal expansion and an increase in $T_g$. For example, one example that contains 12 mol % $Na_2O$ has a $T_g$ of 380° C. and a linear expansion of 160° C. Young's Modulus of the glass will increase with the initial additions of alkali as expected due to the increase in strong bonds between layers. Since the layers are increasingly bridged, one would expect the strength to increase as well, and in fact, the "theoretical" strength, which is determined primarily by Young's Modulus and Fracture Surface Energy, does increase. However, there are also other important attributes to consider as well.

Figure 3:
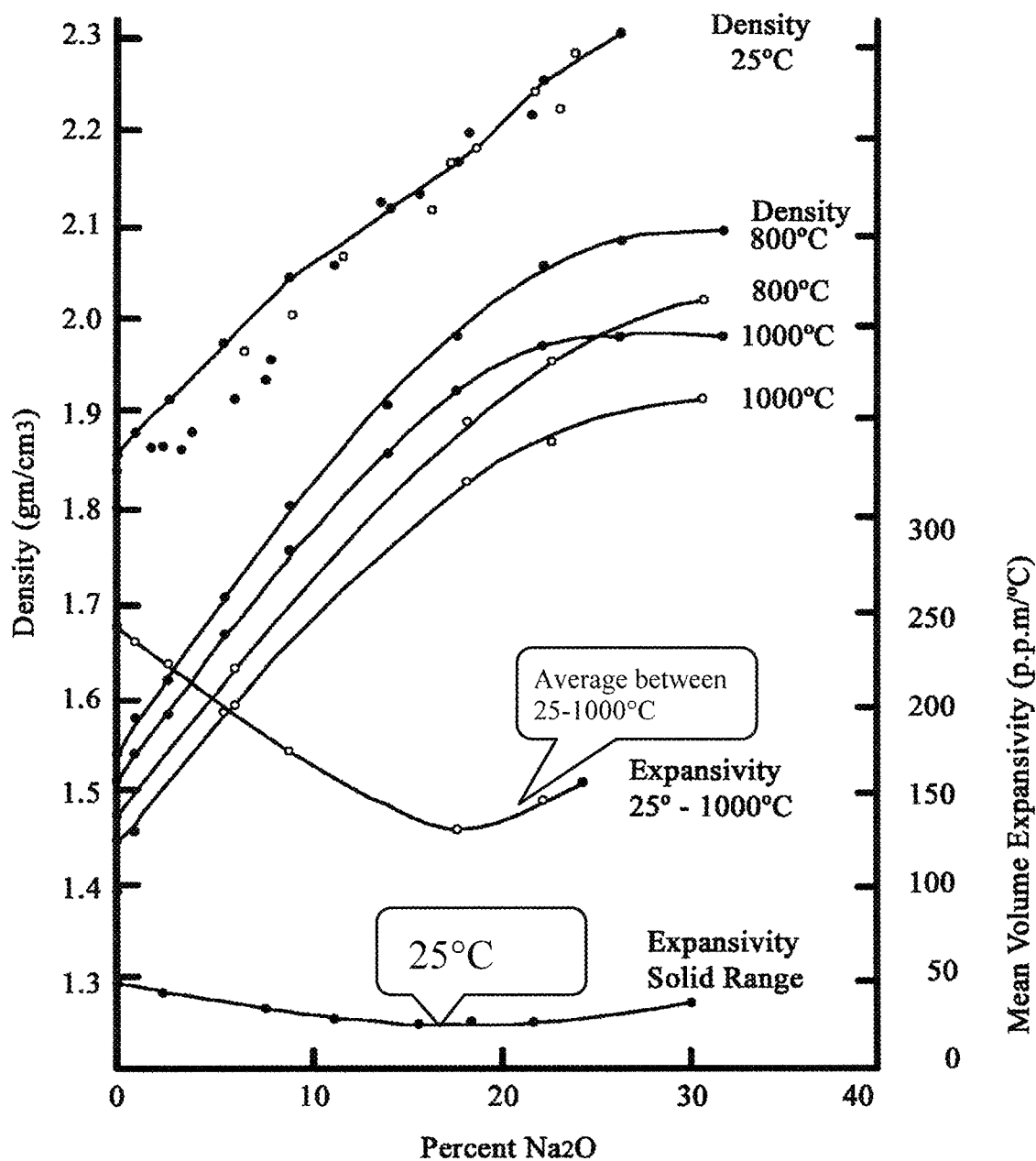
FIG. 3 is a graph comparing density and percentage of sodium oxide.

The most logical way to increase modulus is by an increase in Na content. However, a mixed alkali composition could also be used, such as by adding some additional Li, or K, or Ca. It was found that adding CaO to the mixture in the amounts of 12 mol % CaO, 12 mol % $Na_2O$ to 76 mol % $B_2O_3$ did not give favorable results, due to the high melting point of the composition. Adding $Na_2O$ alone still increases the Modulus but with a much smaller effect on viscosity ($T_g$) and melting point. This is shown in FIG. 3.

The melting point of pure $B_2O_3$ is seen to be about 600° C., while adding 12 mol % melts near 800° C., and the proposed 18-$Na_2O$ melts at 825° C. Commercial glasses are typically melted at a temperature where the viscosity is about 100 Poise. The viscosity of the 12 and 18 mol % $Na_2O$ melts are relatively low even at 800° C., and fairly rapid fining (i.e. bubble removal) can be expected. The 12 mol % glass has a viscosity of 50 poise and the 18 mol % glass has a viscosity of a little less than 100 poise. At 900° C., the 18-$Na_2O$ glass has a viscosity of about 20 Poise, much lower than generally used for glass melting. Thus, both glasses can likely be melted at about 850° C. (1550° F.), or just above the liquidous phase, with rapid homogenization. It has been found that substantially all water is removed after 1 hour at this temperature and that the glasses formed are bubble free. Any bubbles that may appear in the poured samples after these periods are likely due to those which form at the glass/air/crucible interfaces and which flow out with the glass as it is poured.

It should be noted that when using stainless steel crucibles for chemical reactions and oxidation, temperatures above about 850° C. should be avoided. As the viscosity data indicate that the higher temperatures are not needed, it is possible to use stainless steel crucibles if care is taken to avoid exceeding the maximum temperature, at which point bubble formation may occur due to corrosion.

Figure 4:
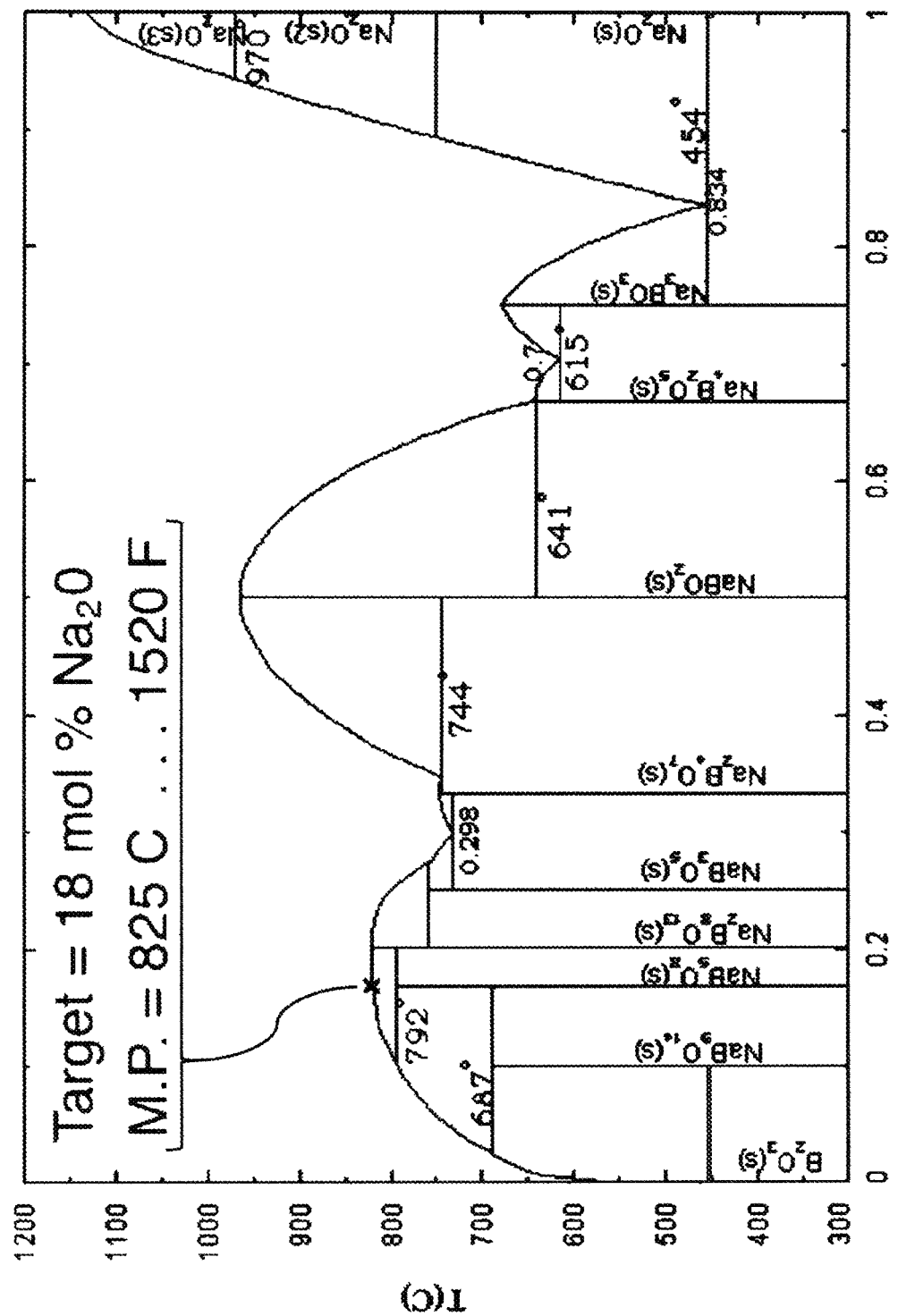
FIG. 4 is a graph comparing different relative amounts of sodium oxide and boric oxide.
Figure 5:
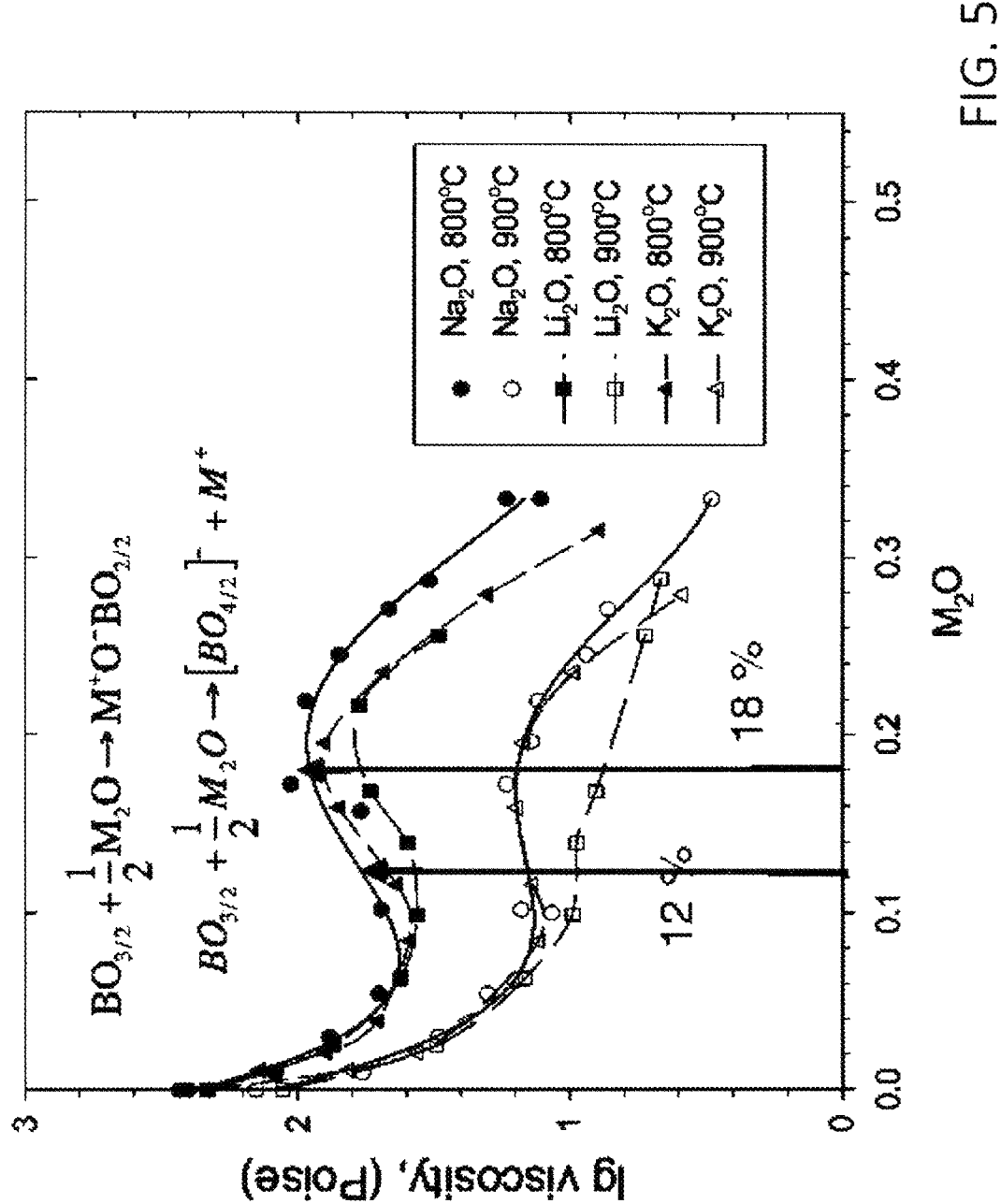
FIG. 5 is a graph of the isothermal viscosities of alkali borate melts.

If a lower viscosity is desired, it may be possible to add a small amount of $Li_2O$ in place of some of the $Na_2O$ (see FIG. 4).

Figure 2:
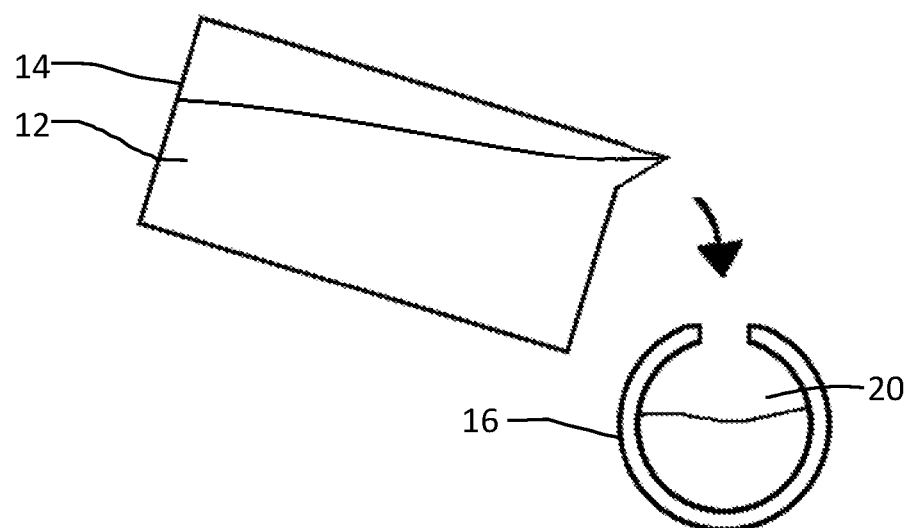
FIG. 2 is a schematic view of a crucible with a melted borate mixture being poured into a mold.

Once the mixture is formed, it is then melted. Referring to FIG. 2, this is preferably done by placing the mixture in a heated crucible 14 or other vessel suitable for melting at high temperatures. Mixture 12 is melted to form a boron mixture in a liquid state and is heated until mixture 12 is in an appropriate state to be molded. While the mixture is initially hydrous, sufficient heat is applied over a sufficient period of time to remove the water in the mixture such that the mixture is anhydrous once it is molded in mold 16. Preferably, the melting time will be less than about 3 or 4 hours, and preferably 1 or 2 hours, in order to release any water in the mixture. The actual temperature and length of time may vary depending on the size of crucible 14 and composition of the mixture, and can be determined by routine testing. It should be noted that, if the mixture is heated too long, the composition may begin to degrade by releasing boron, leaving an excess of oxygen.

In one example, adequate results were achieved by mixing equal portions of boric acid and DOT and heating the mixture to about 800° C. (1500° F.). Generally speaking, the mixture may be heated to between 400° C. and 1050° C. (750° F. and 1900° F.) and more preferably between 800° C. and 900° C. (1500° F. and 1700° F.). Once heated properly to form an anhydrous, moldable mixture, mixture 12 can then be placed in a mold 16, such as by pouring as shown. The details of filling molds with mixture 12 as well as the types of molds that may be used, are known in the art and will not be described in more detail here. It will be understood that FIG. 2 depicts a generic example of a molding process.

If the mixture is not heated properly, the resulting glass may be weakened and may affect the consistency of the dissolving characteristics of the part. It is believed that the weakness may result from water being present in the mixture, and that the effect can be reduced by properly heating the mixture such that the mixture is molded in an anhydrous state. Care must also be taken not to heat mixture too long, as boron may be released from the mixture and release oxygen into the mixture, which may weaken the glass once cooled, or the mixture may set such that it cannot easily be poured or molded. It has been found that a solid anhydrous compound cannot be easily melted and re-molded without a significant increase in the expenditure of energy required.

Prior to receiving mixture 12, mold 16 is preferably heated to a temperature around the annealing point of the resulting glass, which is essentially the glass transition point of the glass being formed. This is useful because stresses cannot be developed in the glass above this temperature. The heat also liberates any water that may be adsorbed to the surface of the mold prior to adding the mixture. In addition to heating the mold, a mold release agent is also preferably applied to the mold surface to prevent sticking as is commonly done in industry. The agent is typically a boron nitride material and is widely available.

In one example, adequate results were achieved by pouring mixture 12 at a minimum temperature of 800° C. (1500° F.) into a mold that has been heated to about 350° C. (700° F.). The mold may be at a temperature of between 200° C. (400° F.) and 800° C. (1500° F.). Preferably, the mold temperature is between 300° C.-500° C. (600° F.-900° F.). The actual temperature will depend on the preferences of the user and the properties of the particular mixture 12 being used. However, it has been found that if the mold temperature is below the minimum, the structural properties of the resulting are weakened, and may not be sufficiently sound, depending on the intended purpose. On the other hand, if the mold temperature is too hot, it has been found that the mixture adheres to the metal of the mold.

Once mold 16 is filled with mixture 12, mold 16 and mixture 12 are cooled until mixture 12 is a solid and can be handled. The time after which the mixture can be removed from the mold will vary by the size and mass of object being molded. Care must be taken during this step as a failure to cool the mixture properly may result in cracking, splitting, deformation or premature failure of the object. Once sufficiently cooled, the now solidified part may then be removed from mold 16 to continue conditioning to form a stable solid. In one example, when forming spheres that were about 2 inches in diameter, a suitable cooling process involved a cooling rate of about 0.1° C./minute for the first 2 hours to reduce the risk of permanent residual stresses. It will be understood that some residual stress may be allowed and possibly desired, since the surface would be under a slight compression, which may increase its strength. Once the initial cooling step has occurred, mixture 16 may be cooled more quickly while still taking care to cool the glass at a safe rate, as the resulting glass is still subject to thermal expansion.

During the cooling phase, the glass may freeze into different structures with different densities and other properties, depending on how fast it is cooled. For example, the density will be lower if the glass is rapidly cooled, and higher if it is cooled more slowly. This should be taken into account for thicker materials, which may have a variable density from the surface to the center.

A variable density may be beneficial in some circumstances, and may increase the strength of the material. Considering a sphere, if the outer surface is cooled more rapidly than the inside, the outer surface will have a lower density than the inside, which will cause tension as the inner area tries to shrink, placing the outer surface under compression. However, if the resulting solid is to be cut or sectioned, the internal stresses could cause weaknesses or failure. For example, if a sphere is formed and has a "tail" (e.g. from the rod formed during the molding process) that must be removed, this will be a source of weakness in the structure.

When cooling mixture 12, it may shrink. This may cause problems in some applications, such as when manufacturing plugs for a selective fracturing operation, which rely on strict tolerances. Shrinkage may be addressed by changing the mold design, or by using a glass composition that does not shrink as much. For example, a suitable amount of an additive such as Sodium oxide ($Na_2O$) may reduce the amount of shrinkage that occurs. While the glass will still be subject to thermal expansion, it has been found that the coefficient may be reduced by about 30 mol % by increasing the amount of $Na_2O$ in the mixture from 12 mol % to 18 mol %.

Figure 6:
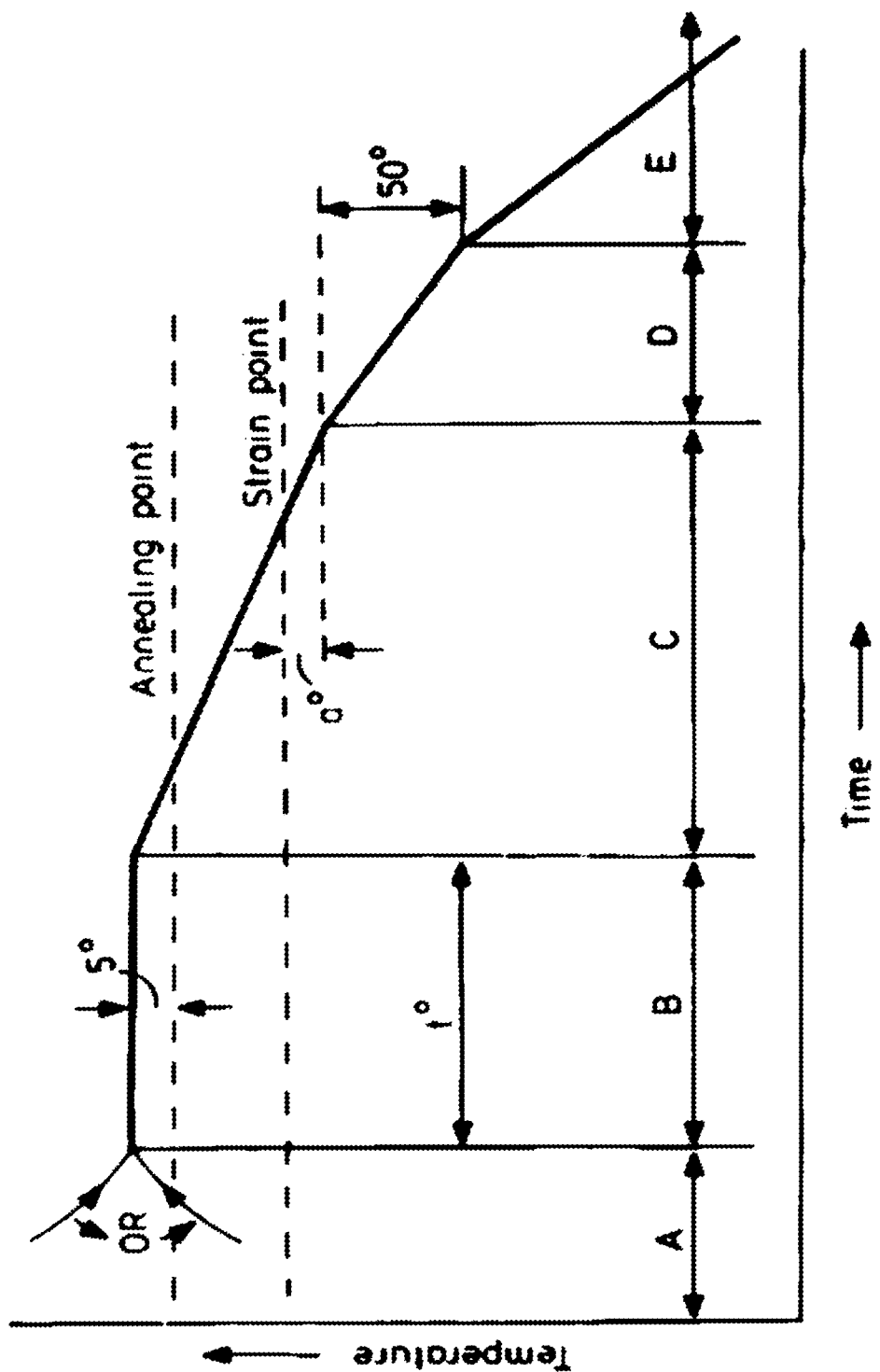
FIG. 6 is a graph showing an example of a cooling schedule.

Referring to FIG. 6, a typical cooling schedule for a glass is shown, where d is the thickness of the glass, or half thickness if the glass is cooled from both sides, and $\alpha$ is the linear thermal expansion coefficient (e.g. $10 \times 10^{-7}$/C). As will be understood, $\alpha$ will depend on the composition of the glass, and will be impacted by the components, and in particular, the amount of alkali. Region A is the "pouring" region, where the temperature may go up or down, depending on the relative temperatures of the mixture and the mold. The heating rate of region A may be described by the expression: $839/[\alpha d^2]$° C./min.

Region B is a hold time at the temperature that is slightly more, such as about 5° C. higher, than the annealing point, which is approximately equivalent to the $T_g$ for the glass. The time in region B may be described by the expression 97d min.

Region C is the "slow cool" stage and is the critical region for relieving stresses. The rate in region C may be described by the expression: $42.6/[\alpha d^2]$° C./min. In the general formula, the coefficient (i.e. 42.6 in this case) relates to the Arrhenius equation, and will depend on the specific temperatures involved. Measurement of the Strain Point and Annealing Point may be difficult but can be estimated from the $T_g$ data obtained using Differential Scanning Calorimetry (DSC). The measured $T_g$ for an 11 mol % composition was about 380° C., and the activation energy was about 575 kJ/mol. For an 18 mol % composition, the $T_g$ was about 450° C. and the activation energy was about 780 kJ/mol. Using these numbers, and assuming an Arrhenius behaviour for viscosity in the temperature range of interest, e.g. $\eta = \eta_o \exp(-\Delta E_{act}/RT)$, it is possible to extrapolate from th $T_g$ where viscosity is $10^{12}$ poise to the annealing point where viscosity is $10^{13}$ poise and to the straon point where viscosity is $10^{14.5}$ poise. The temperature of the strain point is calculated to be 360° C. Based on a 380° C. initial temperature, a 360° C. final temperature, and an expansion coefficient of $104 \times 10^{-7}$, it is calculated that the cooling rate between these two temperatures for minimum stress generation should be=$42.6/(104)(\text{half thickness})^2$. For a 3 inch (7 cm) diameter ball, the rate would be about 0.03° C./min or about 2° C./hour. While this is a minimum rate, the actual rate may be faster, such as at least 0.1° C./min, while still producing a sufficiently stable structure.

Region D is a "fast cool" stage, which is about twice as fast as the slow cool stage, and region E is the "final cool" stage, which may be up to 10 times the speed of the slow cool stage.

The above considerations are relative to the preferred embodiment with 18 mol mol % $Na_2O$. If a higher alkali content is used, or a different alkali or alkali mixture is used, the thermal expansion may decrease or increase, and allow it to be cooled more rapidly, or require a slower cooling process than what is described above.

Another alternative to the cooling schedule described above is to cool the glass rapidly from the pour temperature and then reheat the samples for a "proper" anneal following the Corning formula Applications When used in a selective fracturing tool, the parts are preferably spherical in shape and may be molded with different diameters. Historically, different shapes have been proposed for use in selective fracturing tools. However, it has been determined that spheres work best in the present sleeve activation. Other shapes may also be used if desired by the user, or if the resulting parts are intended to be used for a different purpose. For example, rather than being used as a plug, the seal seats or a component within the seat may be made from the dissolvable material, such that the seat dissolves, or is released for retrieval after a desired period of time. Alternatively, the parts may be used on other pats that are inserted downhole, but that only have a temporary use, or are difficult to retrieve. By using dissolvable parts, the tools may entirely dissolve, or may be released, making them easier to retrieve at a desired time.

In order to be used in a downhole environment, the parts must be sufficiently strong to withstand the typical pressures that will be encountered downhole. If the parts are too brittle, the parts may shatter before they are able to open the stage or maintain the seal until the part dissolves. The specific requirements are known in the art and will not be discussed further.

As stated previously, parts are designed to be dissolvable, although the rate at which the parts dissolve will depend on the temperature, pressure, and fluids encountered downhole. It is possible to adjust the dissolve rate of the part to be either longer or shorter, depending on the preferences of the user and the intended use. In the case of downhole operations, the rate of dissolution must be sufficiently long to allow the fracturing operation to be completed, but not so long that further operations are delayed while the operator waits for the parts to dissolve. The dissolve rate may be modified based on the selection of the original boron compounds used to create the mixture and the relative proportions of the components in the mixture. Generally, for the mixture described herein, there is about a ⅛" loss in 4 hours. The dissolve rate may also be adjusted through the use of additives, such as the group I, group II, or group III metals on the periodic table. For example, the additive may be selected from copper, manganese, molybdenum, zinc, calcium, and silver, each of which may be introduced as a compound. In addition, additives may also be included to deliver compounds downhole as the parts dissolve. For example, the spheres may be used as a delivery method for compounds that act as corrosion inhibitors, such as, for example, copper, zinc, and silver. As will be understood by one skilled in the art, other elements known to exhibit this function may also be selected as a corrosion inhibitor. In addition, the additives may deliver antibacterial compounds such as silver, copper, and zinc compounds or any metalloid that exhibits antibacterial properties. Additives with other properties may also be included in the parts. In addition to the use of additives, the parts may have one or more coatings that delay the dissolution of the part, or deliver desired compounds downhole. For example, the coating may be designed to react to a particular event or chemical, such that the parts may be stable until a condition is selectively altered, which triggers its dissolution.

In addition to the selective fracturing tools, the anhydrous boron glass described herein may be used in other circumstances. For example, the glass may be used to make tools or equipment that are either difficult to retrieve or may be lost during use. In these circumstances, the parts may be made from a glass described herein, and left to dissolve without having to be retrieved.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A dissolvable borate part prepared by a process comprising the steps of:
    creating a mixture of one or more boron compounds and one or more alkali compounds, wherein at least one of the compounds is a hydrous compound;
    melting the mixture by heating to a melting temperature of between about 700° C. and about 1000° C. and dwelling at the melting temperature for a sufficient time to release the water in the mixture and form an anhydrous boron compound that is a moldable fluid, the moldable fluid comprising an alkali oxide content of between about 10 mol % to about 25 mol % and a boric oxide content of between about 75 mol % and about 90 mol %;
    molding the moldable fluid in a mold;
    cooling the moldable fluid to form a solid, the anhydrous boron compound being cooled to below a strain point of the solid over a period of at least 1-4 hours; and
    removing the cooled solid from the mold;
    wherein the part is a sphere with a diameter equal to or greater than about 2 inches.

2. The dissolvable borate part of claim 1, wherein the mixture is melted at a melt temperature of between about 800° C. and about 900° C.

3. The dissolvable borate part of claim 1, wherein the melted mixture is poured into a mold that has a mold temperature that is less than the melt temperature.

4. The dissolvable borate part of claim 1, wherein the moldable fluid comprises an additive selected from a group consisting of copper, zinc, and silver.

5. The dissolvable borate part of claim 1, further comprising an additive selected from a group I, group II, and group III metal on the periodic table.

6. The dissolvable borate part of claim 1, further comprising an additive selected from a group consisting of copper, manganese, molybdenum, zinc, calcium, and silver.

7. The dissolvable borate part of claim 1, wherein the anhydrous boron compound comprises between about 12-20 mol % $Na_2O$ and between about 80-88 mol % $B_2O_3$.

8. The dissolvable borate part of claim 1, wherein the anhydrous boron compound comprises about 18 mol % $Na_2O$ and about 82 mol % $B_2O_3$.

9. The dissolvable borate part of claim 1, wherein the part is cooled to the ambient temperature over a period of about 1-3 hours.

10. The dissolvable borate part of claim 1, wherein the anhydrous boron compound is cooled from the melting temperature by about 10° C. over at least a two hour period.

11. A dissolvable borate part, comprising:
    an anhydrous borate compound that is molded to form an object having a minimum dimension of 2 inches or more and a Young's Modulus of at least 30 GPa, the anhydrous borate compound comprising:
        between about 75 and 90 mol % of $B_2O_3$; and
        between about 10 and 25 mol % of one or more alkali oxide.

12. The dissolvable borate part of claim 11, comprising about 82 mol % of $B_2O_3$ and about 18 mol % of the one or more alkali oxide, and the object has a Young's Modulus of at least 40 GPa.

13. The dissolvable borate part of claim 11, wherein a majority of the one or more alkali oxide comprises $Na_2O$.

14. The dissolvable borate part of claim 11, wherein the anhydrous borate compound is substantially free of silicate.

* * * * *